Patented June 21, 1949

2,473,801

UNITED STATES PATENT OFFICE 2,473,801

EMULSIONS OF POLYMERIZABLE COMPOSITIONS

Edward L. Kropa, Stamford, Conn., assignor to American Cyanamid Company, New York, N. Y., a corporation of Maine No Drawing. Application April 1, 1939, Serial No. 265,543

2 Claims. (Cl. 260—29.2)

This invention relates to emulsions and dispersions including water and a reactive resin of the alkyd type admixed with certain reactive organic substances, the admixture being capable of forming a substantially insoluble, substantially infusible resin upon polymerization.

One of the objects of this invention is to prepare emulsions containing polymerizable compositions suitable for coating purposes.

Another object of this invention is to prepare emulsions containing polymerizable compositions suitable for use in printing textiles, paper and other such printing operations.

These and other objects are attained by the preparation of emulsions or dispersions of potentially polymerizable mixtures which produce substantially insoluble, substantially infusible resins on polymerization. These mixtures include a resin possessing a plurality of polymerizably reactive alpha, beta-enal groups, i. e.,

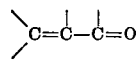

and at least one organic substance which contains the polymerizably reactive group $CH_2=C<$.

For the sake of brevity, the organic substances which contain the polymerizably reactive group, $CH_2=C<$, will be referred to herein as "reactive materials" or as "reactive materials containing the $CH_2=C<$ group" and they are thus to be distinguished from the resins which possess a plurality of polymerizably reactive alpha, beta-enal groups which are designated herein as "reactive resins."

Many of the reactive materials containing the $CH_2=C<$ group are solvents and therefore the reactive resins may be dissolved therein to form liquid compositions which may be used as such without the addition of any other solvent unless particularly desirable.

It is to be understood, however, that I am not restricted to substances which actually act as solvents since in some cases the organic substance may, in fact, act as a solute rather than as a solvent, it being dissolved by the resin, or a colloidal solution may be produced instead of a true solution. Furthermore, the organic substance may be a resin containing a plurality of $CH_2=C<$ groups. Such a substance could be cured by a reactive resin or by a reactive material which contains polymerizably reactive alpha, beta-enal groups or such substances may be derived from alpha, beta unsaturated organic acids, for example by esterification of such acids.

Among the reactive resins used in the practice of this invention for interaction with the reactive material containing the $CH_2=C<$ group are those which are derived from alpha, beta-unsaturated organic acids and, therefore, contain the reactive groupings present in these acids. The term "acids" as used herein is intended to include the anhydrides as well as the acids themselves since the former may frequently be used more conveniently, e. g., maleic anhydride may be used instead of the acid. The term "alpha, beta-unsaturated organic acid" as used in the art does not include acids wherein the unsaturated group is part of an aromatic-acting radical, as for example phthalic acid and the same definition is adopted herein.

The reactive resins are preferably produced by the esterification of an alpha, beta-unsaturated organic acid with a polyhydric alcohol and particularly, a glycol. Although esterification of the acid with a polyhydric alcohol is perhaps one of the simplest and most convenient methods of obtaining a reactive resin, I am not precluded from using resins otherwise derived from alpha, beta-unsaturated organic acids. Reactive resins suitable for my invention are any of those containing a plurality of polymerizably reactive alpha, beta-enal groups.

PREPARATION OF THE EMULSION

Emulsions of reactive mixtures such as those described herein are produced by agitation of the said reactive mixture with water and with or without an added emulsifier.

Some of these reactive mixtures are inherently emulsifiable since the resin may act as an emulsifier. Examples of such resins are those derived from the polyethylene glycols e. g. hexaethylene glycol maleate, heptaethylene glycol maleate, octaethylene glycol maleate, etc. It may also be desirable to employ mixtures of polyethylene glycols to produce such resins. The higher polyethylene glycols give more stable emulsions than the lower members of the series. Furthermore, if the reactive resin in the reactive mixture is composed of a resin which does not act as an emulsifier, then an emulsifier will usually be necessary to produce an emulsion sufficiently stable for most purposes. Obviously a small portion of a reactive resin which will act as an emulsifier e. g. the polyethylene glycol resins, can be used as the emulsifier and may be incorporated in the original reactive mixture. This is particularly advantageous inasmuch as the emulsifier itself will be cured and become part of the homogeneous product which is obtained upon polymerization.

Other compatible emulsifiers may be used and may be selected from the following types: Diamyl, dihexyl or dioctyl sulfosuccinic esters and salts thereof, salts of alkylated naphthalene sulfonic acids, long chain quaternary ammonium compounds, sulfonated or sulfated higher alcohols, e. g. lauryl sulfate, the salts of the sulfated or sulfonated higher alcohols, sulfonated oils, glycol oleates and linoleates, mineral oil sulfonates, aromatic sulfonates, wax acid soaps, triethanolamine soaps such as the oleate, monoglycerol linoleates, amino sulfonates and sulfates, ammoniacal or other alkaline caseins, soaps, lecithin, cholesterol, saponin, emulsifying gums such as gum arabic, gelatine, etc.

Obviously various mixtures of these emulsifiers and/or wetting agents may be employed in order to obtain suitable stability of the emulsions for the particular purpose for which the composition is to be put. For some purposes a quick breaking emulsion will be more desirable, while for other purposes a relatively stable emulsion will be required. By judiciously selecting the emulsifier or combination of emulsifiers and the concentration thereof, an emulsion may be produced with suitable characteristics for any particular use.

In conjunction with the emulsifiers certain stabilizers or other surface tension modifiers may be used. Examples of these are the relatively low molecular weight polar compounds, e. g. the amines, alcohols, ketones, etc. Specific examples of these are cyclohexanol, benzyl alcohol, etc. Other substances such as pine oil may be employed similarly.

The emulsions which are produced according to my invention may have the water either in the dispersed phase or in the continuous phase. This will vary according to the particular reactive mixture employed and with the various emulsifiers which may be used.

The following examples are exemplary of the emulsions which may be produced according to my invention but they are given only by way of example and not in limitation.

*Example 1*

A mixture containing 50 parts of vinyl acetate and 50 parts of polyethylene glycol maleate resin (a mixture containing hexaethylene glycol as the major constituent with minor amounts of other polyethylene glycols is used in making this resin) is shaken or mixed with a high speed stirrer with 100 parts of water. To the resulting emulsion 0.05 part of cobalt chloride is added together with 10 parts of an autodispersible green dye. Such an emulsion will cure in a short time at 90° C. if printed on cloth, etc. and withstands soap and water washing, and pressing.

*Example 2*

Emulsions are produced by agitating mixtures containing styrene and polyethylene glycol maleate resins with an equal weight of water. About 0.4% benzoyl peroxide is added to the reactive mixture before emulsification. Upon subjecting such emulsions to polymerization conditions such as heating at 45–90° C. the reactive mixture gels to form hard resins.

*Example 3*

Emulsions are produced by agitating 20 parts of water with a mixture containing 10 parts of diallyl maleate, 10 parts of polyethylene glycol maleate resin, about 0.2 part of 0.1% aqueous solution of cobalt chloride and 0.4% benzoyl peroxide. Films baked at 90° C. dry in about six to ten minutes.

*Example 4*

An emulsion is produced by agitating 100 parts of water with a mixture containing 50 parts of hexaethylene glycol maleate resin and 50 parts of diallyl maleate. About 0.05% cobalt naphthenate and about 0.2% benzoyl peroxide are added to the reactive mixture before emulsification. The reactive mixture polymerizes readily when subjected to heat, e. g. 90° C. for about fifteen to forty-five minutes.

*Example 5*

A mixture containing 40 parts of diallyl maleate and 60 parts of a resin, produced by reacting a mixture of 31.2 parts triethylene glycol, 12.8 parts ethylene glycol, 30.8 parts phthalic anhydride, 20.4 parts maleic anhydride and 4.8 parts linseed oil acids, is emulsified with 100 parts of water containing an acid type of emulsifier, e. g. 0.25 part sodium lauryl sulfate and 1 part of sulfonated castor oil.

*Example 6*

An emulsion is made by agitating a mixture containing 55 parts of the resin used in Example 5, 25 parts of the resin used in Example 4 and 50 parts of diallyl maleate with 100 parts of water. A thin but rather stable emulsion is produced.

*Example 7*

Example 6 is repeated using only 50 parts of water and with about 0.13 part sodium lauryl sulfate and 0.5 part of sulfonated castor oil added to the water. A much thicker emulsion is obtained than that in Example 6. Catalysts are added as before, i. e. 0.05% cobalt naphthenate. Upon subjection to polymerization conditions the reactive mixture gels to form tough resins.

*Example 8*

A mixture containing 60 parts of the resin used in Example 5 and 40 parts of diallyl phthalate is agitated with 50 parts of water containing about 0.13 part of sodium lauryl sulfate and about 0.5 part of sulfonated castor oil. Catalysts are added to the reactive mixture as before, e. g. about 0.05% cobalt naphthenate. Upon subjecting films of the emulsion to polymerization conditions the reactive mixture polymerizes readily to form a hard, tough resin.

*Example 9*

A mixture containing 60 parts of the resin used in Example 5 and 40 parts of diallyl maleate is mixed with about 50 parts of an aqueous solution containing an alkaline type emulsifier. An example of such an aqueous solution is the following: 5 parts of casein, 1 part triethanolamine, 5 parts concentrated aqueous ammonium hydroxide (about 9%) and 40 parts of water. A thick emulsion is produced. Catalysts are added as before and upon subjection to polymerization conditions the reactive mixture forms a tough resin.

The emulsions which are produced in accordance with my invention may be used for a wide variety of purposes where it is desirable to obtain small quantities of a convertible resin either in thin films, or as an impregnating agent for fibrous materials such as paper, fabrics, leather, etc.

Upon application of the emulsion to fabrics or other such materials and upon subjection to heat or other polymerizing conditions, the emulsion breaks, the water evaporates, and the reactive mixture is polymerized to substantially infusible, substantially insoluble form.

By judiciously selecting a reactive resin and a reactive material containing the $CH_2=C<$ group, a resulting resin may be obtained which will be particularly suited for the purpose to which the resin emulsion is to be put.

PREPARATION OF THE POLYMERIZABLE MIXTURE

A reactive resin such as is prepared by the esterification of an alpha, beta-unsaturated organic acid and a glycol or other polyhydric alcohol as illustrated above is mixed with a reactive material containing the group $CH_2=C<$. Upon the addition of a polymerization catalyst and subjection of the mixture to polymerization conditions such as, for example, heat, light or a combination of both, a substantially insoluble, substantially infusible resin is obtained. Among the reactive materials which I have found to be most suitable are those having a high boiling point such as the allyl esters, e. g., diallyl maleate, diallyl fumarate, diallyl phthalate and diallyl succinate. Other allyl compounds may also be used which are not necessarily high boiling. Monoallyl compounds, e. g., allyl alcohol and methallyl alcohol, react only very slowly and are, therefore, limited in their use. The diallyl esters, being both quite active and high boiling, are especially important from the commercial point of view. Triallyl esters may also be used, e. g., triallyl tricarballylate. Furthermore, allyl esters of inorganic esters may be used, e. g., triallyl phosphate. Other suitable reactive materials include the methyl, ethyl, propyl, butyl, cyclohexyl, cetyl and other alkyl esters of acrylic and methacrylic acids. Aliphatic vinyl esters may also be used including vinyl acetate, vinyl butyrate, vinyl laurate, vinyl stearate, etc. Styrene may be used with compatible reactive resins such as, for example, the long chain glycol resins. Other reactive materials which may be used are acrolein, methacrolein, acrylonitrile and methacrylonitrile, vinyl ether, etc. Water soluble curing agents such as acrylamide and methacrylamide may also be used as such or in admixture. All of these substances are characterized by the presence of the reactive group $CH_2=C<$ and none of them contain conjugated carbon to carbon double bonds. Compounds containing a conjugated system of carbon to carbon double bonds are known to react with themselves or with other unsaturated compounds such as the maleic esters by a 1,2–1,4 addition mechanism such as that which has become generally known as the Diels-Alder reaction. On the other hand, compounds such as those used according to the present invention and which contain no conjugated carbon to carbon double bonds obviously cannot undergo this type of reaction with the maleic esters. Accordingly, my invention is not directed to the use of unsaturated compounds containing conjugated systems of carbon to carbon double bonds. In many instances it will be advantageous to use mixtures of the reactive materials. In this way the speed of the reaction may be controlled somewhat, the compatibility of some of the resins improved and in some instances improved products are obtained.

The polymerization catalysts include the organic superoxides, aldehydic and acidic peroxides. Among the preferred catalysts for incorporation into the reactive mixtures there are: the acidic peroxides, e. g., benzoyl peroxide, phthalic peroxide, succinic peroxide and benzoylacetic peroxide; fatty oil acid peroxides, e. g., cocoanut oil acid peroxides, stearic peroxide, lauroyl peroxide and oleic peroxide; alcohol peroxides, e. g., tertiary butyl peroxide and terpene oxides e. g., ascaridole. Still other polymerization catalysts might be used in some instances, namely soluble cobalt salts (particularly the linoleate and naphthenate), p-toluene sulfonic acid, aluminum chloride, stannic chloride, boron trifluoride, etc. If desirable, the polymerization catalyst may be added to the aqueous emulsion of the reactive mixture and if the continuous phase be water then a water soluble catalyst should preferably be used, e. g., hydrogen peroxide, water soluble cobalt salts, etc.

The concentration of catalyst employed is usually small, i. e. for the preferred catalyst, from about 1 to 20 parts catalyst per 1000 parts of the reactive mixture. In an inhibitor be present, up to 5% or even more of the catalyst may be necessary according to the concentration of inhibitor.

The term polymerization catalyst as used in this specification is not intended to cover oxygen contained in the resin as an impurity. While this small amount of oxygen would only catalyze to a very small extent, in order to eliminate any ambiguity the term polymerization catalyst is specifically defined as excluding any oxygen present as an impurity in the resin itself.

The polymerization conditions referred to are heat, light, or a combination of both. Ultraviolet light is more effective than ordinary light. The temperature of conversion depends somewhat on the boiling point of the reactive material containing the $CH_2=C<$ group and also on the pressures used. At atmospheric pressure as generally used in coating operations temperatures near or above the boiling point are unsuitable in most instances since substantial amounts of the reactive material containing the $CH_2=C<$ group which acts as the solvent would be lost by evaporation before the reaction between the resin and reactive material can be completed. Accordingly a temperature between room temperature (about 20–25° C.) and the boiling point is usually employed where polymerization of this nature is carried out. The rate of polymerization doubles for about each 10° (C.) rise in temperature. For this reaction a temperature is selected which will give a suitable reaction rate and yet not cause substantial volatilization of the reactive material. The following table shows the approximate polymerization temperatures most suitable for the named reactive materials.

| Reactive Material | Temperature Range | Preferred Temperature |
|---|---|---|
| | | °C. |
| Vinyl acetate | Room temp. to about 50° C. | 37 |
| Styrene | 55° to about 120° C. | 80 |
| Methyl methacrylate | 40° to about 65° C. | 58 |
| Diallyl maleate | Room temp. to about 110° C. | 50–90 |
| Diallyl phthalate | Room temp. to about 150° C. | 50–90 |

The particular reactive resin, reactive material containing the $CH_2=C<$ group and catalyst is selected according to the type of product desired, taking into account the solubilities of the reactants as well as the character of the resulting gels. Some combinations of reactive resin and reactive materials result in opaque gels while others give clear products in the gel state. Obviously for many purposes the opaque gel may be equally as useful as the clear gel.

The reaction mixture may be modified in several ways in order to produce a composition suitable for any particular use. If a thinner mixture is desired than is obtained upon the mixing of the reactive resin and reactive material, it is possible in some instances to reduce the viscosity. This may be done by adding an esterification catalyst, e. g. p-toluene sulfonic acid and then heating until the viscosity is suitably reduced.

If a thicker mixture is desired than that normally obtained with a mixture of the reactive resin and the reactive material containing the $CH_2=C<$ group, the said mixture may be bodied by heating. This may be done at about 70° C. to about 110° C., preferably at about 90° C. for sufficient length of time to give the desired viscosity. This bodying process may be also used to reduce the induction period for curing the reactive mixture. If this be the case, the bodying process is continued until the viscosity begins to rise rapidly, indicating that the induction period has been substantially reduced. A general rule for determining the heating time is to heat the mixture until the viscosity is about two to three times the initial viscosity.

After the bodying operation is carried out, the polymerization catalyst is added to the mixture. In this connection the use of liquid peroxides is more convenient than the use of solid peroxides since the latter are more difficult to get dissolved rapidly enough. Peroxides of the cocoanut oil acids, tertiary butyl peroxide and ascaridole are suitable liquids.

By the use of this bodying process the induction period is cut down from approximately ½ to ⅛ of the time when the bodying process is not used. Even greater reductions are obtained with some mixtures.

In some instances it may be desirable to incorporate a polymerization inhibitor in the reactive mixture. This may be done either to permit the reactive mixture to be stored for some period of time or to control the rate of reaction of the mixture on subjection of said mixture to polymerization conditions. When it is desired to use this mixture, a small percentage of polymerization catalyst is added, sufficient to overcome the effect of the inhibitor as well as to promote the polymerization. By careful control of the concentrations of inhibitor and catalyst a uniform product is obtained with a good reaction velocity. Suitable polymerization inhibitors of this reaction are phenolic compounds, especially the polyhydric phenols, and aromatic amines. Specific examples of this group of inhibitors are hydroquinone, resorcinol, tannin, sym. di, beta naphthyl p-phenylene diamine and phenolic resins. Sulfur compounds are also suitable. The more preferred examples of inhibitors are benzaldehyde and l-ascorbic acid. The concentration of inhibitor is preferably low and I have found that less than 1% is usually sufficient. However, with the preferred inhibitors I prefer to use only about 0.01% to about 0.1%.

The inhibitor may be incorporated in the reactive resin-reactive material combination (either before or after bodying) or it may be added to the original reactive resin before or during the esterification of the said reactive resin. By adding the inhibitor to the unesterified mixture the inhibitor may become bound into the resins upon subsequent esterification, thus permitting the use of an inhibitor which might not be soluble in the finished resin.

If the reactive mixture is to be made into emulsion form at the time of preparation, the polymerization catalyst may be incorporated into the reactive mixture before emulsification if the emulsion is to be used promptly. On the other hand, if the emulsion is to be stored for some time before use, it may be more desirable to add a catalyst soluble in the continuous phase of the emulsion just before using said emulsion.

THE REACTIVE RESINS AND THEIR PREPARATION

Reactive resins suitable for polymerization with reactive materials containing the $CH_2=C<$ group in accordance with the teachings of my invention are those which contain a plurality of alpha, beta-enal groups. The simplest members of this group of resins are those produced by the esterification of an alpha, beta unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired, it is preferable to use glycols which do not have any oxygen bridges in their structure since the presence of oxygen linkage may lead to the formation of color bodies during the preparation of the resin. By the use of glycols which do not contain oxygen bridges clear, colorless resins may be produced. On the other hand, oxygen bridges may be desirable if the resin is to be used in coating as they cause films to dry faster.

The particular choice of glycol or other polyhydric alcohol used in preparing the resin is governed mainly by the physical properties desired of the intermediate and final polymerization products and films, especially hardness, distensibility, refractive index, adhesion, compatibility relationships, etc. including also solvent, water, alkali, soap acid or chemical resistance in general.

The alpha, beta unsaturated organic acids which I prefer to use in preparing the reactive resins include maleic, fumaric, itaconic and citraconic, although other similar acids could be substituted such as mesaconic acid, aconitic acid and halogenated maleic acids such as chlormaleic acid and any of the foregoing could be substituted in part with acrylic, beta benzoyl-acrylic, methacrylic, $\Delta^1$-cyclohexene carboxylic, cinnamic, and crotonic acids. Obviously various mixtures of any of these acids can be used where expedient.

The reactive resins may be modified with other substances which are used in alkyd resins, i. e., monohydric alcohols, monobasic acids or dibasic acids, e. g. phthalic acid, sebacic acid, etc. which do not contain groups polymerizably reactive with respect to organic substances containing $CH_2=C<$ groups. These modifying agents are usually used as diluents or plasticizers.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta unsaturated organic acids. Consequently it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing $CH_2=C<$. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing $CH_2=C<$ groups be used, the proportion of such substances will depend on the properties required of the polymerized reactive material-reactive resin mixture. By the use of a relatively large proportion of a polymerizably active dibasic acid e. g. maleic, in the reactive resin, a hard, tough polymer is produced upon subsequent reaction of said reactive resin with a reactive material containing the $CH_2=C<$ group. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymeriaztion with a reactive material. The same effect may be produced by the introduction of other inactive ingredients. By varying the ingredients and the proportions of the ingredients, resins may be obtained having properties desirable for almost any particular use.

If it be desirable to introduce lower alkyl groups into the resin, this may be done by using maleic esters of monohydric alcohols, e. g. ethyl maleate. The alkyl ester will then be united with the resin by polymerization. This could not be accomplished with the saturated type of alkyd, e. g. phthalic acid esters of polyhydric alcohols.

Resins which contain a plurality of alpha, beta enal groups are sensitive to light, heat and polymerizing catalysts. Since oxygen tends to cause these resins to polymerize, it is desirable that the resins should be made in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants, an inert gas such as carbon dioxide or nitrogen may be introduced into the reaction chamber. This may be done either by merely passing the gas over the surface or by bubbling the gas through the liquid reactants. In the latter instance it may be made to perform the added function of agitating the mixture thus eliminating the necessity for mechanical agitation. The inert gas will also carry away at least part of the water formed and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its passage through the first batch of resin reactants.

The effect of light is not so important if the reactants are purified and the reaction carried on in an inert atmosphere as outlined above. However, as an added precaution the esterification may be conducted in the dark. It is also advisable to avoid local overheating and discoloration is minimized if the reaction is conducted below a temperature of about 200° C. To avoid overheating it is advisable to raise the temperature slowly at the beginning, inasmuch as the reaction between the acid or anhydride and the alcohol is exothermic.

The preparation of the reactive resins is illustrated in the following examples, the reactants being given in parts by weight:

Example 10

98 parts of freshly distilled maleic anhydride were reacted with about 10% in excess of equimolecular proportions of freshly distilled ethylene glycol (68 parts) at about 170-175° C. An excess of ethylene glycol is preferred because of its high volatility. The mixture is continuously agitated and carbon dioxide is introduced into the reaction chamber during the reaction, thereby blanketing the surface of the reactants. After eight to twelve hours a clear, water-white resin is produced with an acid number of 35-50.

Example 11

| | Parts by weight |
|---|---|
| Hexaethylene glycol | 5495 |
| Maleic anhydride | 1936 |

These molecular equivalent proportions were reacted in a partially closed container adapted to permit the free escape of the water of esterification. The temperature was taken to 210° C. in thirty-five minutes and was held at between 210° C. and 218° C. for an additional period of about ninety-three minutes and the reaction was then discontinued.

The product which was obtained was a light amber-colored liquid having a viscosity of about 46.3 of poises at 25° C., a refractive index of about 1.4822 at 25° C. and an acid number of about 45.3.

PREPARATION OF REACTIVE RESIN AZEOTROPICALLY

Since the viscosity of the resin frequently becomes quite high if the esterification is carried to a low acid number, it may be desirable to produce the resin under azeotropic conditions. Accordingly the esterification is conducted in an organic solvent which dissolves the reactants as well as the resultant resin and which is preferably substantially insoluble in water. Example of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone, although some of these may tend to darken the resin. The mixture is refluxed in such a manner as to separate the water formed by the esterification. Much lower temperatures are used than are used under the conditions outlined in Examples 10–11. Suitable temperatures range between 90–145° C., for example, for the lower boiling members of the group of solvents set forth above. Obviously this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, and p-toluene sulfonic acid. Obviously other known esterification catalysts could be used. A resin having any particular acid number, if made azeotropically, will usually have a lower viscosity than one of the corresponding acid number not made azeotropically.

Example 12

98 parts by weight of maleic anhydride (vacuum distilled), 106 parts by weight of diethylene glycol (vacuum distilled), about 175 parts ethylene dichloride and about 3 parts d-camphor sulfonic acid were mixed in a reaction chamber and heated under reflux. The heating was conducted in an oil bath maintained at 130°–145° C. for nine hours. The distillation temperature began at about 90° C. but gradually rose during the heating. The apparatus was so arranged that the water would be separated from the reflux. A light yellow resin with an acid number of about 19.8 was produced after driving off the volatile ingredients including the ethylene dichloride.

The resins prepared in the manner illustrated above are merely exemplary of the reactive resins which I contemplate using for reaction with a reactive material containing the $CH_2=C<$ group in the practice of my invention. Other resins of the same type may be prepared in a similar manner.

Among these resins are the following which may be used in place of those mentioned above: diethylene glycol maleate, alpha propylene glycol maleate, polyethylene glycol maleates (e. g. hexaethylene glycol maleate, heptaethylene glycol maleate, octaethylene glycol maleate, dodecaethylene glycol maleate, etc.), polymethylene glycol maleates (e. g. decamethylene glycol maleate), octadecandiol maleate, the maleic esters: of 2,2-dimethyl propanediol-1,3, of 1,3 butanediol, of 1,2 propanediol, and of 2 ethyl, 2 butyl butanediol-1,3, glycerol maleate undecylenate, triethylene glycol chlormaleate, triethylene glycol terpene maleate (derived from the interaction of ½ mol of terpene and 1 mol of maleic in the presence of excess of terpene).

Obviously natural resins or other synthetic resins may be admixed with the resins of this invention in order to obtain products suitable for particular purposes. Examples of these are shellac, cellulose esters and ethers, urea resins, melamine resins, phenolic resins, alkyd resins, ester gum, etc. The resins of my invention may also be mixed with rubber or synthetic rubber-like products if desired.

Obviously many modifications and variations in the processes and compositions described herein may be made without departing from the spirit and scope of the invention as defined in the appended claims.

I claim:

1. An aqueous emulsion containing a homogeneous mixture including a polymerizably reactive monomeric polyallyl ester of a polybasic acid having no conjugated carbon-to-carbon double bonds, and a maleic polyester of hexaethylene glycol.

2. An aqueous emulsion containing a homogeneous mixture including a polymerizably reactive monomeric polyallyl ester of a polybasic acid having no conjugated carbon-to-carbon double bonds, a polyhydric alcohol-polybasic acid resin prepared from molecularly equivalent proportions of saturated polyhydric alcohol and alpha,beta-unsaturated polycarboxylic acid and containing a plurality of polymerizably reactive alpha,beta-enal groups, and a small proportion of polyester resin of hexaethylene glycol and an alpha,beta-unsaturated dicarboxylic acid.

EDWARD L. KROPA.

REFERENCES CITED

The following references are of record in the file of this patent:

UNITED STATES PATENTS

| Number | Name | Date |
|---|---|---|
| 1,967,220 | Barrett et al. | July 24, 1934 |
| 1,975,246 | Zwilgmeyer | Oct. 2, 1934 |
| 2,029,410 | Carothers et al. | Feb. 4, 1936 |
| 2,036,009 | Wright | Mar. 31, 1936 |
| 2,047,398 | Voss et al. | July 14, 1936 |
| 2,078,194 | Collins | Apr. 20, 1937 |
| 2,104,760 | Renfrew | Jan. 11, 1938 |
| 2,155,591 | Garvey | Apr. 25, 1939 |
| 2,160,532 | Barrett | May 20, 1939 |
| 2,166,542 | Bradley | July 19, 1939 |
| 2,182,316 | Hopff et al. | Dec. 5, 1939 |
| 2,255,313 | Ellis | Sept. 9, 1941 |
| 2,279,436 | Berg | Apr. 14, 1942 |
| 2,443,736 | Kropa | June 22, 1948 |

FOREIGN PATENTS

| Number | Country | Date |
|---|---|---|
| 547,384 | Germany | Mar. 20, 1932 |